June 24, 1958  R. A. SUTHANN  2,840,336
SELF-ALIGNING POPPET VALVE
Filed Sept. 28, 1953

ROBERT A. SUTHANN,
INVENTOR.

BY
ATTORNEY

United States Patent Office 2,840,336
Patented June 24, 1958

2,840,336

SELF-ALIGNING POPPET VALVE

Robert A. Suthann, Burbank, Calif., assignor to Hydro-Aire, Inc., Burbank, Calif., a corporation of California Application September 28, 1953, Serial No. 382,561

6 Claims. (Cl. 251—85)

This invention relates to poppet valves, and particularly to a novel valve seat structure adapted to cooperate with a self-aligning poppet element to provide a highly effective valve seal.

In conventional poppet valve structures, and especially in poppet valves of the type designed to control fluids under relatively high pressures, it is necessary to accurately machine the various valve surfaces, including the valve stem and related parts, in order to achieve the necessary degree of sealing when the valve is closed. Furthermore, even when the valve components are machined with extreme precision the desired seal is frequently not present after the valve has been in use for a substantial length of time since wear of the seat or poppet may cause misalignment, lack of concentricity, and other factors resulting in leakage. In addition to creating leakage, the excessive wear on the poppet and seat may disrupt the operation of the valve, for example when the valve is of a balanced type so that it is necessary that the various sealing diameters be maintained constant.

A self-aligning valve structure adapted to overcome the above disadvantages was described and claimed in my co-pending application Serial No. 345,546, now Patent No. 2,713,986, filed March 30, 1953, for a self-aligning poppet valve. In that application, the self-aligning poppet element was described as formed of nylon or other suitable soft material, the nylon being adapted to cooperate with the sharp edge of a valve seat formed of hard metal. Upon contact between the relatively sharp metallic valve seat and the nylon poppet, a sealing groove is formed in the poppet which incorporates any imperfections in the seat to effect, in conjunction with the self-aligning elements of the valve, a substantially perfect seal regardless of wear and other factors. However, it has been found that in order for the described sealing groove to be formed in the nylon poppet member the contact between poppet and seat must be relatively prolonged. This is undesirable since, for certain applications of the invention, the valve is either normally open or is of the rapidly opening and closing type, so that the contact between the poppet and seat is relatively brief. In such applications, a groove adequate to provide the desired seal may not be formed.

In view of the above problems characteristic of the field of poppet valves, it is an object of the present invention to provide a self-aligning poppet element adapted to automatically align itself upon engaging the valve seat, the seat being deformable by the poppet to form a substantially perfect sealing contact regardless of the duration of the engagement.

Another object of the invention is to provide means for forming an effective seal between a relatively soft stationary valve seat and the metallic casing in which the seat is mounted.

A further object of the invention is to provide a novel poppet valve embodying cushioning means to materially reduce the wear between poppet and seat, self-aligning poppet means adapted to automatically come into continuous contact with the seat upon valve closing, and a relatively soft valve seat means adapted to cooperate with the poppet means in a manner enhancing the sealing cooperation between poppet and seat.

These and other more specific objects will appear upon a reading of the following specification and claims, and upon considering in connection therewith the attached drawing to which they relate.

Figure 1:
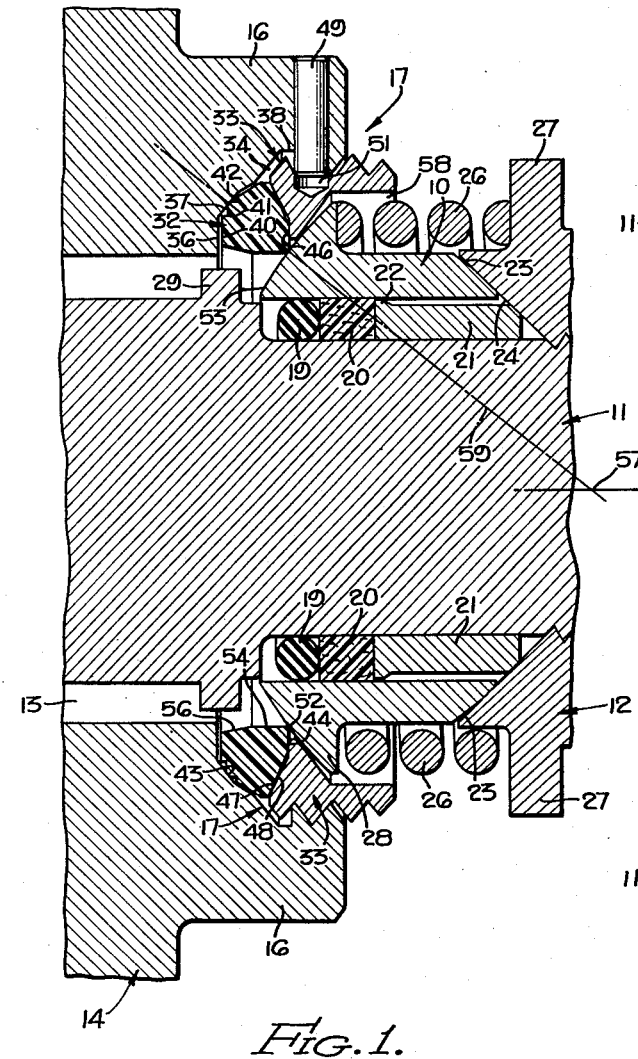
Figure 1 is a greatly enlarged longitudinal central sectional view of a poppet and valve seat structure embodying the invention.

Referring to the drawing, each of the three embodiments of the present invention comprises a poppet ring 10 mounted over a stem 11 and normally held in position by a metal poppet or back-up ring 12 which is threaded or otherwise secured over the outer portion of the stem. The stem 11 is normally cylindrical in shape and extends into a substantially larger cylindrical passage 13 in a casing 14, the latter having an annular boss portion 16 adapted to receive a valve seat structure 17 to be described in detail subsequently. The stem 11 may form part of a balancing arrangement, not shown, permitting shifting of the valve independently of pressures present in the system. Alternatively, the valve may be of an unbalanced type such as one in which the poppet is urged toward seated position by a spring, not shown, in engagement with the outer portion of back-up 12.

As shown in Figure 1, the poppet ring 10 is of substantially larger internal diameter than the diameter of stem 11 at the corresponding location. Disposed between the poppet ring and stem are an O-ring 19 formed of a rubber compound or other suitable elastomer, a back-up ring 20 of rectangular section and formed of a suitable substance such as synthetic leather, and a metallic positioning ring 21 extending between the outer face of ring 20 and the inner end surface of ring 12. In the present structure, it is assumed that the relatively higher pressure is in the passage 13 as distinguished from outwardly of the poppet, or to the right as shown in the drawing. This relatively high passage pressure operates to compress O-ring 19 against back-up ring 20, the back-up ring in turn being held by positioning ring 21. The back-up ring 20 serves to prevent damage to O-ring 19 due to its distortion into a clearance gap between the poppet 10 and an external flange or lip portion 22 of the positioning ring, the main body of the latter being of substantially lesser thickness than back-up ring 20.

When poppet 10 is mounted as indicated, it is free to rotate, into aligned connection, about any transverse axis passing through the longitudinal axis of stem 11 inwardly of the poppet. The aligning rotation is facilitated because of the resilience of the O-ring 19 and back-up ring 20, and by making the outer end surface 23 of the poppet 10 and the corresponding end surface 24 of ring 12 inclined relative to the axis of stem 11. For example, in the illustrated embodiment the poppet surface 23 is spherical or rounded, and the cooperating surface 24 of back-up 12 is inclined to form a frusto-cone. With the described construction, the poppet ring 10 will tend to come into aligned position relative to the valve seat structure 17 upon shifting of the stem 11, to the left in Figure 1, until the poppet and seat are engaged. This aligned position will not be disturbed by the pressure engagement of surface 24 with surface 23.

An additional self-aligning action, and a cushioning action tending to prevent wear during the valve-closing operation, is provided by a helical compression spring 26 mounted around poppet 10. Spring 26 is seated between an external flange 27 on back-up 12, and a flange 28 on the inner end of poppet ring 10. The compression spring 26 operates, when the stem 11 is shifted toward the right or valve-opening position, to disengage surfaces 23 and 24 and space the poppet ring from its back-up until the inner edge of the poppet seats on a stop flange 29 formed on stem 11 generally inwardly of seat structure 17. When stem 11 is then shifted to the left in order to close the valve, the valve-closing operation is cushioned in that the poppet 10 first engages the valve seat structure 17, after which the stem 11 continues its closing movement to compress spring 26 until surfaces 23 and 24 come into engagement.

For a description of the construction and operation of various poppet valves embodying the self-aligning and cushioning functions mentioned above, reference is had to my Patent No. 2,713,986 to which reference has previously been made. This application also cites various equivalent structures and functions, such as a modification in the location of O-ring 19 where the higher pressure is located outside the poppet as distinguished from within the passage 13. It is to be understood that all of the self-aligning and cushioning principles and modifications mentioned in my co-pending application are equally applicable to the present structure.

Referring to the embodiment of Figure 1, the valve seat structure 17 of the preset invention comprises a seat ring 32 adapted to be held in position by a retaining ring 33, both the seat ring and retaining ring being positioned in a groove 34 formed in the inner edge of casing boss 16. The groove 34 is provided with a radial surface 36, in a plane perpendicular to the axis of stem 11, with a radially and forwardly inclined generally frusto-conical surface 37, and with an axially extending cylidrical surface 38 which is threaded to receive the correspondingly threaded outer surface of retaining ring 33. Radial surface 36 has spaced from it a corresponding radial surface 40 of seat ring 32, and frusto-conical surface 37 is opposite a generally frusto-conical surface of the seat ring. The latter surface has two grooves 41 and 42 separated by a relatively high angular ridge 43 adapted to sealingly engage surface 37 as will be described. The ridge 43 is initially pressed against the surface 37 by retaining ring 33, this action being enhanced by forming the retaining ring with a radial surface 44, adapted to engage a corresponding radial surface 46 of the seat ring, and with a radially and inwardly extending frusto-conical surface 47 engaging at its outer portion with a correspondingly shaped seat surface 48.

In the operation of the components of seat structure 17 thus far described, the seat ring 32 is first positioned in groove 34 and retaining ring 33 is threaded into the threaded portion 38 of the groove. The turning or threading of retaining ring 33 is continued until ridge 43 is in engagement with frusto-conical groove surface 37, this action being effected by ring surfaces 44 and 47. A pin 49 is then inserted through a bore in boss portion 16 and into one of a number of circumferentially spaced recesses 51 in the retaining ring to rigidly lock it in the desired position. Because of the described shapes of the seat and retaining rings, all of the force of the retaining ring against the seat ring is brought to bear on the sealing ridge 43 to provide a maximum sealing action preventing leakage of fluid from passage 13 and between the seat ring and casing.

To enhance the sealing action between ridge 43 and the casing, and more importantly to create an effective seal between the seat ring 32 and poppet 10, the seat ring is formed with a relatively sharp edge 52, and the inner edge of poppet 10 is formed with a relatively flat and smooth beveled surface 53. The sharp edge 52 is formed by providing an axially extending cylindrical surface 54 intersecting radial surface 46, the cylindrical surface 54 preferably merging with a frusto-conical surface 56 adjacent the radial surface 40 at the inner portion of the seat ring. The surface 53 of the poppet ring is preferably spherical about a point 57 disposed on the axis of stem 11 and inwardly of metal back-up ring 12. This spherical surface is adapted, when the valve is in closed condition as illustrated, to engage only the sharp edge 52 of the seat ring, there being a groove 58 in retaining ring 33 shaped to prevent any engagement between the retaining and poppet rings.

As indicated by the dashed radius 59, the edge 52 and the apex of sealing ridge 43 are in line with each other and with the center point 57 for spherical surface 53. Stated otherwise, any point on the apex of sealing ridge 43 is intersected by a line normal to spherical surface 53 at its corresponding point of engagement with edge 52. Because of this relative location of ridge 43, edge 52 and center point 57, the engagement of surface 53 with edge 52 will operate most effectively to increase the sealing pressure between ridge 43 and the cooperating groove wall. Two factors thus cooperate in providing an effective seal between ridge 43 and the casing, namely the pressure created by retaining ring 33 and the pressure of poppet 10 on edge 52. It will be noted that the retaining ring 33 is shaped so that the seat ring 32 is free to shift toward surface 37 when edge 52 is engaged by the poppet.

According to the invention, the poppet ring 10 is formed of a relatively rigid and hard substance such as steel, and the seat ring 32 is formed of a relatively deformable and wear-resistant substance such as a synthetic resin, preferably nylon. With a seat ring thus formed, the edge 52 will tend to conform to any irregularities in the spherical surface 53, which will operate to enhance the sealing action between the poppet and its seat. Such conforming of the seat edge 52 and the poppet is effected in a relatively short time since only a small amount of work need be done by the poppet in rearranging the contour of the edge 52. This is to be distinguished from structures in which the hard component of the valve is formed with a sharp edge, and the soft component with a relatively flat surface. In the latter type of structure, a relatively large amount of work must be done by the hard component in forming a sealing groove in the soft component, and a relatively long-time interval must elapse before an effective sealing action occurs.

To summarize the operation of the valve described in Figure 1, let it be assumed that the stem 11 is initially shifted to its right or valve-opening position. The inner end of poppet 10 will then be seated on flange 29, due to operation of compression spring 26, and spherical surface 53 will be disengaged from seat ring edge 52 to permit escape of the fluid in passage 13. When the stem 11 is then shifted to the left to close the valve, surface 53 first engages with edge 52 and is automatically aligned to the most effective sealing position. Upon further shifting of stem 11 to the left, spring 26 is compressed until surfaces 23 and 24 come into engagement with each other and the maximum closing pressure is brought to bear on edge 52, for example by a compression spring acting on the outer end of back-up 12. Because of the shape of surfaces 23 and 24, this closing pressure does not tend to shift the poppet 10 out of alignment relative to its seat. After a short interval of pressure engagement between surface 53 and edge 52, the edge comes into conformity with the surface irregularities and creates an extremely effective seal preventing any leakage of fluid from passage 13. In addition, the pressure acts along any radius 59 to enhance the sealing action created between ridge 43 and surface 37 of the casing.

Figure 2:
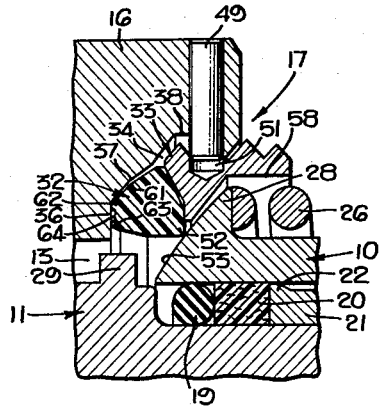
Figure 2 is a fragmentary longitudinal sectional view illustrating a second embodiment of the valve seat structure of the present invention.

Referring to Figure 2, a second embodiment of the invention is illustrated, and is identical in construction and operation to the embodiment described in Figure 1 except with relation to the seat ring 32. Furthermore, the seat ring 32 is identical to that previously described, except that the sealing ridge 43, and adjacent grooves 41 and 42, are replaced by a relatively smooth, generally frusto-conical surface 61, and the radial surface 40 of the embodiment of Figure 1 is replaced by two ridges 62 and 63 separated by a groove 64. The ridges 62 and 63 have sharp edges disposed to engage the radial casing surface 36 and provide a sealing contact preventing leakage of fluid between the casing and seat ring 32. The sealing pressure between the ridges 62 and 63 and surface 36 is primarily effected by operation of retaining ring 33, the action of spherical surface 53 on edge 52 being of lesser importance in this instance.

Figure 3:
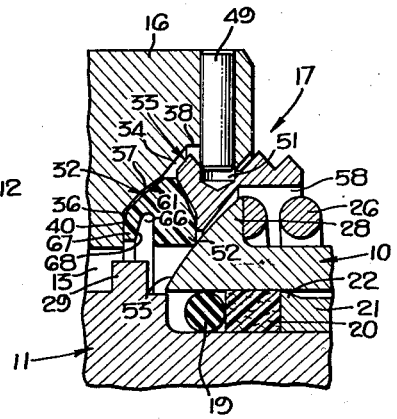
Figure 3 is a view, corresponding to Figure 2, but illustrating a third embodiment of the valve seat structure.

A third embodiment of the invention is shown in Figure 3, which illustrates a valve identical to that of Figures 1 and 2 except for the construction of seat ring 32. In this embodiment, the surface 61 of Figure 2 is again provided adjacent frusto-conical casing surface 37, and the radial surface 40 described in connection with Figure 1 is provided adjacent the radial surface 36 of the casing. There being no sharp ridges on the inner surface of seat ring 32, the sealing action is effected by providing a groove 66 in the inner portion of ring 32 and spaced axially outwardly from surface 40. The groove 66 defines a radially inwardly extending lip 67 one surface 68 of which forms a wall of groove 66, and the other surface of which is the surface 40 previously described. With this construction, the pressure in passage 13 enters groove 66 and presses on the surface 68 to force lip 67 axially inwardly until surface 40 is in tight sealing engagement with the cooperating surface 36 of the casing.

Except for the described modifications in the form of seat ring 32, the operation of the embodiments illustrated in Figures 2 and 3 is identical to that described in detail in connection with Figure 1.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a self-aligning poppet valve structure, a metallic valve casing having a cylindrical passage therein, a valve seat ring mounted at one end of said passage, said seat ring being formed of a relatively deformable material and having a relatively sharp edge, a valve stem movably mounted in said passage and protruding from said one end thereof, a poppet ring mounted loosely around the protruding portion of said stem, said poppet ring being formed of a relatively hard material and having a substantially flat surface adapted to engage said edge and deform the same, and a back-up ring mounted on said stem at the side of said poppet ring remote from said seat ring, said back-up ring being adapted to force said poppet ring against said edge and being formed with an inclined abutment surface permitting said poppet to remain aligned relative to said edge after engagement therewith.

2. The invention as claimed in claim 1, wherein a resilient sealing element is provided on said stem radially inwardly of said poppet ring.

3. In a poppet valve structure, a metallic valve casing having a cylindrical passage therein and an annular groove formed therein at one end of said passage, a seat ring mounted in said groove, said seat ring being formed of relatively deformable material and with a sharp sealing edge, back-up ring means fixedly mounted on said casing to retain said seat ring in position, a valve stem movably mounted in said passage and protruding from said one end thereof, and a poppet mounted on the protruding portion of said stem, said poppet being formed of relatively hard material and having a substantially flat sealing portion adapted to engage said sharp sealing edge upon shifting of said stem to valve closing position, said seat ring being shaped to provide a seal preventing leakage of fluid between said seat ring and the wall of said groove, said seal being effected by forming said seat ring with at least one sharp ridge protruding into sealing engagement with said groove wall, any point on said ridge being on a line substantially normal to said flat sealing portion of said poppet at its corresponding point of contact with said sealing edge of said seat ring.

4. In a poppet valve structure, a metallic valve casing having a cylindrical passage therein, and an annular groove formed therein at one end of said passage, a seat ring mounted in said groove, said seat ring being formed of relatively deformable material and with a relatively sharp sealing edge, a retaining ring threaded into said groove to maintain said seat ring in position, a cylindrical valve stem movably mounted in said passage and protruding from said one end thereof, a poppet ring mounted loosely over said protruding portion of said stem, an elastomeric O-ring mounted on said stem radially inwardly of said poppet and adapted to prevent leakage between said stem and poppet ring while permitting aligning rotation of said poppet ring, a back-up ring mounted on said stem on the side of said poppet ring remote from said seat ring, and a spring mounted between said back-up ring and poppet ring to cushion the engagement of said poppet ring with said sealing edge.

5. The invention as claimed in claim 4, wherein the end of said poppet ring adjacent said seat ring is spherical about a center point on the axis of said stem and radially inwardly of said back-up ring.

6. The invention as claimed in claim 5, wherein said seat ring is provided with a sealing ridge adapted to sealingly engage a wall of said groove, and wherein the apex of any increment of said sealing ridge, and the corresponding point of engagement of said spherical poppet ring end with said relatively sharp sealing edge, lie on a radius of said spherical poppet end.

References Cited in the file of this patent

UNITED STATES PATENTS

| | | |
|---|---|---|
| 1,971,713 | Greve | Aug. 28, 1934 |
| 2,240,521 | Schnell | May 6, 1941 |
| 2,594,999 | Robinson | Apr. 29, 1952 |
| 2,639,884 | Mitchell | May 26, 1953 |

FOREIGN PATENTS

| | | |
|---|---|---|
| 578,973 | Great Britain | July 18, 1946 |